(12) United States Patent  
Cheston et al.

(10) Patent No.: US 9,152,195 B2  
(45) Date of Patent: Oct. 6, 2015

(54) WAKE ON CLOUD

(71) Applicant: Lenovo (Singapore) Pte. Ltd., Singapore (SG)

(72) Inventors: Richard W. Cheston, Pittsboro, NC (US); Howard J. Locker, Cary, NC (US); Randall S. Springfield, Chapel Hill, NC (US); Goran H. Wibran, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 266 days.

(21) Appl. No.: 13/746,253

(22) Filed: Jan. 21, 2013

(65) Prior Publication Data

US 2014/0208132 A1    Jul. 24, 2014

(51) Int. Cl.
| | |
|---|---|
| *G06F 15/173* | (2006.01) |
| *G06F 1/26* | (2006.01) |
| *H04L 29/08* | (2006.01) |
| *G06F 1/32* | (2006.01) |
| *H04L 12/12* | (2006.01) |
| *G06F 12/00* | (2006.01) |

(52) U.S. Cl.
CPC ................ *G06F 1/26* (2013.01); *G06F 1/3209* (2013.01); *H04L 12/12* (2013.01); *H04L 29/08072* (2013.01)

(58) Field of Classification Search
USPC .................................. 709/203, 223–229, 250
See application file for complete search history.

(56) References Cited

U.S. PATENT DOCUMENTS

| | | | |
|---|---|---|---|
| 6,751,459 B1 | 6/2004 | Lee et al. | |
| 8,594,612 B2 * | 11/2013 | Kumar et al. | 455/343.2 |
| 2006/0126603 A1 | 6/2006 | Shimizu et al. | |
| 2006/0253545 A1 | 11/2006 | Lakamp | |
| 2008/0313712 A1 | 12/2008 | Ellison et al. | |
| 2009/0210519 A1 * | 8/2009 | Zill et al. | 709/220 |
| 2010/0100716 A1 * | 4/2010 | Scott et al. | 713/1 |
| 2010/0188698 A1 * | 7/2010 | Koizumi | 358/1.15 |
| 2011/0320015 A1 * | 12/2011 | Yun et al. | 700/19 |
| 2012/0110177 A1 * | 5/2012 | Malobrodsky et al. | 709/225 |
| 2013/0235770 A1 * | 9/2013 | Merlin et al. | 370/311 |
| 2014/0208132 A1 * | 7/2014 | Cheston et al. | 713/310 |
| 2014/0298066 A1 * | 10/2014 | Zhang et al. | 713/323 |
| 2015/0006936 A1 * | 1/2015 | Yasui | 713/323 |

FOREIGN PATENT DOCUMENTS

JP    2003-319083 A    11/2003

OTHER PUBLICATIONS

Application No. GB1322074.4, Combined Search and Examination Report of Jul. 31, 2014 (7 pages).
Citrix, GoToMyPC Technology Making Life Simpler for Remote and Mobile Workers, 2010 (6 pages).
Citrix, GoToMyPC: Total Mobility, 2012 (2 pages).

(Continued)

*Primary Examiner* — Zarni Maung
(74) *Attorney, Agent, or Firm* — Brian J. Pangrle

(57) ABSTRACT

A method can include receiving a request to access a specified resource associated with a user account; and, in response to the request, transmitting, to a network address associated with the user account, instructions for waking a system or device from a sleep state and for accessing the specified resource. Various other apparatuses, systems, methods, etc., are also disclosed.

19 Claims, 8 Drawing Sheets

(56) References Cited

OTHER PUBLICATIONS

Citrix, GoToMyPC Corporate Security White Paper, 2010 (13 pages).

Cisco, Cisco GGSN Gateway GPRS Support Node, 2010 (3 pages).
Cisco, Configuring Application Layer Protocol Inspection, 2008 (52 pages).
Cisco, Introduction to Cisco IOS Flexible NetFlow, 2008 (21 pages).
Cisco, Cisco IOS Firewall, 2012 (9 pages).

* cited by examiner

WAKE ON CLOUD

TECHNICAL FIELD

Subject matter disclosed herein generally relates to technologies and techniques for accessing remote resources.

BACKGROUND

A user may desire access to a work computer while at home. In such a situation, a virtual private network (VPN). A VPN extends a private network and the resources contained in the network across public networks like the Internet. It enables a host computer to send and receive data across shared or public networks as if it were a private network with all the functionality, security and management policies of the private network. A VPN establishes a virtual point-to-point connection through the use of dedicated connections, encryption, or a combination of the two. Various technologies and techniques described herein can provide for access to remote resources.

SUMMARY

A method can include receiving a request to access a specified resource associated with a user account; and, in response to the request, transmitting, to a network address associated with the user account, instructions for waking a system or device from a sleep state and for accessing the specified resource. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
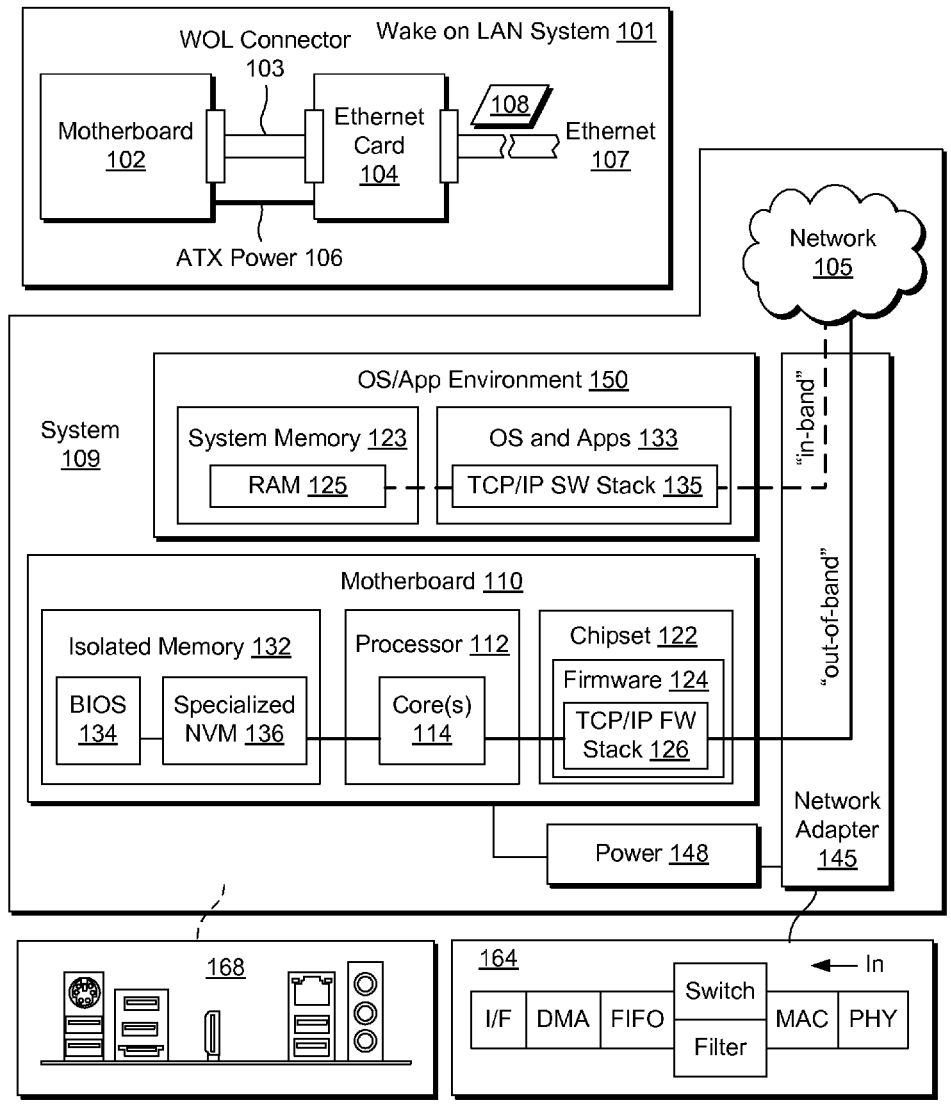
FIG. 1 is a diagram of an example of a wake on LAN system and an example of a system configured for in-band and out-of-band communication paths.

FIG. 1 shows an example of a system 101 and an example of a system 109. The systems 101 and 109 are configured for network communication. The system 101 may be referred to as a wake on LAN system ("WOL"). As shown in the example of FIG. 1, the system 101 includes a motherboard 102, a WOL connector 103 to an Ethernet card 104 (e.g., a network interface card or NIC), and a power connection 106 (e.g., according to a specification such as AT, ATX, etc.). Where the system 101 is connected to an Ethernet 107, a so-called "magic" packet 108 may be transmitted and received by the Ethernet card 104, which, in turn, may communicate with the motherboard 102. Where circuitry of the motherboard 102 is in a sleep state, receipt of the magic packet 108 by the Ethernet card 104 may result in one or more actions to change the state of the circuitry of the motherboard 102.

As inferred by the term "wake on LAN" (WOL), the Ethernet 107 is a local area network (LAN). For the system 101, identification information (e.g., an IP address, etc.) may be stored in memory on Ethernet card 104. In such an example, the power connection 106 may provide about 600 mA of standby current to support functions of the Ethernet card 104 that allow it to receive the magic packet 108.

The magic packet 108 is a particular type of network message that includes a MAC address for a destination system. Power provided to the Ethernet card 104 allows it to perform "listening" operations for the system 101, where once it "hears" a magic packet addressed to it, the Ethernet card 104 commences a system wake-up process for the system 101 via communication of information via the WOL connector 103.

The aforementioned listening and hearing process may also be referred to as "sniffing". As an example, consider a packet analyzer (e.g., network analyzer, protocol analyzer, packet sniffer, Ethernet sniffer, wireless sniffer, etc.) as circuitry (e.g., code/hardware, hardware, etc.) that can intercept and log traffic passing over a digital network or part of a network. As data streams flow across the network, the sniffer captures each packet and, if appropriate, decodes the packet's raw data, showing the values of various fields in the packet, and analyzes its content (e.g., according to an appropriate RFC specification, etc.).

As to the magic packet 108, it may be a broadcast frame that includes in its payload 6 bytes of all 255 (FF FF FF FF FF FF in hexadecimal), followed by sixteen repetitions of a target system's 48-bit MAC address (e.g., for a total of 102 bytes). As an example, a magic packet is scanned for such a string and, it may not be parsed (e.g., by a full protocol stack), as such, it may be sent as any network- and transport-layer protocol (e.g., consider sending as a UDP datagram to port 7 or 9, or directly over Ethernet as EtherType 0x0842).

A magic packet may include, in addition to a MAC address, a credential, such as a password. A magic packet normally does not provide for delivery confirmation and it may not operate outside of a local area network (LAN). As an example, a wireless interface such as a 802.11 wireless interface may not have access to power in various sleep states of a system and, as such, may not be available for receipt of a magic packet.

As to a MAC address, the acronym MAC stands for Media Access Control, as a sublayer of the multiple Ethernet sublayers: PHY (physical), MAC, and LLC (logical). An Ethernet address may be considered as being part of the MAC sublayer. As an example, the physical layer may be responsible for the "wire" while the MAC may be responsible for formatting data that goes on the wire. The logical layer may be considered as being responsible for tasks such as retransmitting data on the wire.

An Ethernet MAC address may be a 48 bit number composed of a 24-bits to identify a vendor of an Ethernet card and 24-bits as a serial number assigned to the Ethernet card by the vendor. Such an approach acts to avoid two Ethernet cards having the same MAC address. Another term used for the MAC address is "organizationally unique identifier" (OUI), which has a bit to indicate if an address is a "broadcast/ multicast" address and a bit to indicates if an Ethernet card (e.g., a network adapter) has been reassigned a locally administered address (e.g., where a network administrator reassigns the MAC address to fit some policy). As an example, consider a MAC address 03 00 00 00 00 01 on a wire where the first byte contains the binary representation of 00000011 where both these special bits are set (and the rest are zero). This is a special multicast packet that is sent to all machines that run the NetBEUI protocol (e.g., as may be installed on WINDOWS® OS systems to share files locally without using TCP/IP as the transport).

Referring again to the system 101, the magic packet 108 may be sent by a device on a data link or layer 2 in an OSI model and broadcast to all Ethernet cards (e.g., NICs) using the network broadcast address; noting that in such an example the IP-address (layer 3 in the OSI model) is not used.

For the wake on LAN system 101 to operate, as mentioned, at least some of the components of the Ethernet card 104 need to be powered. As an example, where a system is configured to be powered in the short-term by battery power, a wake on LAN feature may be disabled when the system is powered by battery (e.g., according to a default configuration, a policy, etc.).

A wake on LAN implementation may be relatively simple for quick processing by circuitry of an Ethernet card with minimal power requirement. In the example of FIG. 1, the wake on LAN system 101 operates "below" an IP protocol layer, thus, the MAC address is required; noting that IP addresses and DNS names may be meaningless to such a system.

The wake on LAN system 101 is implemented using various components including the motherboard 102 (e.g., BIOS) and the Ethernet card 104 (e.g., firmware) and, as shown, not dependent on an operating system; not dependent on Ethernet card drivers (e.g., NIC drivers) running on hardware. As an example, a motherboard with an embedded Ethernet controller configured to support WOL may not need a cable (see, e.g., the WOL connector 103); however, it will require power (e.g., per an ATX specification).

As to the system 109, it connects to a network 105 (e.g., the Internet, etc.) via a network adapter 145 powered by a power source 148 and includes a so-called out-of-band communication path and a so-called in-band communication path. In the example of FIG. 1, the network 105 may include one or more of the Internet (e.g., where communication may occur via one or more Internet protocols), a cellular network, a satellite network, etc.

As shown in the example of FIG. 1, the out-of-band communication path operates with respect to components on a motherboard 110 while the in-band communication path operates with respect to an OS/application environment 150. As shown, the motherboard 110 includes a processor 112 with one or more cores 114, a chipset 122 with firmware 124 that supports a TCP/IP firmware stack 126, and isolated memory 132, which includes BIOS 134 and specialized non-volatile memory 136, for example, to store particular information that may support the out-of-band communication path. The OS/application environment 150 includes system memory 123 with random access memory 125 and an operating system and one or more applications 133 along with a TCP/IP software stack 135.

As to the network adapter 145, it may be supplied with power (e.g., via the power source 148 or another power source), for example, with a standby line capable of providing adequate standby current. As an example, the network adapter may include a low power, chip-based architecture. As an example, a network adapter may be configured for power with one or more rails (e.g., a 3.3 V rail, a 1.9 V rail, a 1.05 V rail, etc.). As an example, power consumption for a state "S0" (see, e.g., further below for description of some power states) in a maximum 1000Base-T active mode, at about 90° C. may be about 900 mW (e.g., depending on power configuration). In an "idle" mode, power consumption may be less and, for example, for a wake-on-LAN 100 Mb/s mode (e.g., D3 cold state, see, e.g., various "SX" power states), it may be about 200 mW or less and even less with a lesser data rate (e.g., 10 Mb/s); with wake-on-LAN disabled, power consumption may be about 35 mW. As an example, for 1.05 V DC rail, power consumption for a wake-on-LAN 100 Mb/s mode may be about 170 mW at a current of about 25 mA. Power consumption may be available from a network adapter, for example, in a set number of units (e.g., per 100 mW blocks).

As an example, "sleep" may define a low power consumption mode or state that may provide for an operational configuration (e.g., open apps, cursor position, etc.) of a system or device to be restored from powered memory (e.g., consider an "S3" state). As an example, a sleep state may be a deeper sleep state where an operational configuration (e.g., open apps, cursor position, etc.) of a system or device to be restored is restored from a component such as a hard drive, which may take longer than being restored from powered memory, but which may consume less power while asleep. In the foregoing examples, for the low power consumption modes or states, power is provided to circuitry to provide to "sniff" a network (e.g., for packet inspection).

A network adapter may include memory with an Ethernet individual address (IA), for example, as a 6-byte field that may be unique for the adapter. As an example, a nine-digit printed board assembly (PBA) number may be included in a network adapter, for example, in memory (e.g., EEPROM).

As an example, the network adapter 145 may be a LAN subsystem PCI bus network adapter configured to monitor network traffic, for example, at a so-called Media Independent Interface. Upon detecting a particular packet frame (e.g., in a "magic" packet), network adapter 145 may assert a wake-up signal, for example, that powers up a device (e.g., an information handling device such as a computer). While a magic packet is mentioned, wake capabilities may occur, for example, responsive to receipt of a PCI Express WAKE# signal, a ping, etc. For example, reception of a network wake-up packet (e.g., magic or other), detection of a link change of state, etc. may result in waking. While LAN is mentioned, as an example, a signal (e.g., a command, a packet or other information) may be received via cellular circuitry, infra-red circuitry or other type of communication circuitry.

As an example, the network adapter may include various feature, for example, a network adapter may include a Gigabit Ethernet controller, a RJ-45 LAN connector, a CSMA/CD protocol engine, a LAN connect interface between a PCH and a LAN controller, PCI bus power management, ACPI technology support, LAN wake capabilities, ACPI technology support, LAN subsystem software, etc.

As an example, a network adapter may be IEEE 802.3 compliant, Energy Efficient Ethernet (EEE) IEEE802.3az supported (e.g., Low Power Idle [LPI] mode), dual interconnected between an integrated LAN controller and a Physical Layer (PHY), PCI Express-based interfaced for active state operation (S0) state, SMBUS connected for host and management traffic (Sx low power state), compliant to IEEE 802.3x flow control support, supportive of 802.1p and 802.1q, and supportive of TCP, IP, and UDP checksum offload (e.g., IPv4 and IPv6), etc.

As an example, a network adapter may be chip-based with compact, low power components with Gigabit Ethernet Media Access Control (MAC) and Physical Layer (PHY) port. Such a network adapter may use the PCI Express (PCIe) architecture, for example for implementation as a LAN on a motherboard (LOM) configuration or, for example, embedded as part of a switch add-on card, a network appliance, etc.

FIG. 1 shows an example of a network adapter architecture 164 with various components that may be included in a network adapter such as the network adapter 145. In such an example, packet reception may include recognizing the presence of a packet on a "wire", performing address filtering, storing the packet in a receive data FIFO, transferring the data to a receive queue in host memory, and updating the state of a receive descriptor. As to filtering, for example, consider an exact unicast/multicast where a destination address must exactly match one of a plurality of stored addresses (e.g., unicast and/or multicast addresses). In a multicast scenario, as an example, upper bits of an incoming packet's destination address index may be a bit vector for indicating whether to accept the packet. As another example, a VLAN filter mode may be supported. As an example, a filter may check a MAC destination address for validity (e.g., such as, IA match, broadcast, multicast, etc.). As an example, a SNAP/VLAN filter may check next headers looking for an IP header and be capable of decoding, for example, Ethernet II, Ethernet SNAP, and IEEE 802.3ac headers. As an example, filters may include IPv4, IPv6, UDP/TCP, etc. While receipt is shown in the architecture 164, transmission may occur in via a network adapter. FIG. 1 also shows some examples of connectors 168, for example, as associated with a motherboard such as the motherboard 110, for example, including the network adapter 145 as an "on-board" feature.

As an example, a method may include reading the power management enable bits from a NVM initialization control word into power management enable bits of a wake-up call (WUC). Such bits may control enabling of a power management wake-up. As an example, a wake-up may be multi-tiered, for example, implementing a filter to recognize information as associated with a destination and a subsequent (or parallel) filter to recognize a wake-up command. As an example, a filter may be pre-defined, flexible, etc. As an example, data of a packet that passes recognition and wake-up filters may include information that may be stored to memory of a network adapter (e.g., some number of bytes in an internal buffer, etc.), which, for example, may be read from the memory after a system wakes up. As an example, such information may indicate what resource or resources may be available via a system after its waking (see, e.g., FIGS. 2, 3, 4, etc.). As an example, waking may occur via one or more instructions submitted via a PCI or other type of interface. As an example, instructing as to resource availability may occur via one or more instructions submitted via a PCI or other type of interface.

In the example of FIG. 1, the in-band communication path goes through the software stack 135 (e.g., as provided by an operating system) and is secured via operating system and software-based security applications; whereas, the out-of-band communication path (e.g., tunnel) sits "below" the OS/application environment 150 and goes through the TCP/IP firmware stack 126 and is secured with hardware-based transport layer security (TLS) encryption and, for example, one or more other robust methodologies and technologies.

As an example, the motherboard 110 may include components such as those marketed by Intel Corporation (Santa Clara, Calif.). As an example, one or more components may support the Intel® Active Management Technology (AMT), as a hardware-based technology for remotely managing and securing computing systems in out-of-band operational modes. Intel® AMT is a set of remote management and security features designed into hardware that can, for example, allow a system administrator with AMT security privileges to access system information and perform specific remote operations on a system that includes the hardware. As an example, such remote operations may include remote power up/down (e.g., via wake on LAN), remote/redirected boot (e.g., via integrated device electronics redirect, or IDE-R), console redirection (e.g., via serial over LAN), and other remote management and security features.

As an example, a network adapter may include one or more features of an Intel® Ethernet controller, for example, as described in a document entitled "Intel® 82583V GbE Controller" (Rev. 2.5, June 2012), which is incorporated by reference herein.

As an example, out-of-band communication may be performed using AMT and, for example, a management engine such as the Intel® Management Engine (ME). The Intel® ME provides access to Intel® AMT features where AMT communication depends on the state of the ME, not the state of an OS. As part of the Intel® ME, an AMT out-of-band communication channel is based on a TCP/IP firmware stack designed into hardware. Because it is based on the TCP/IP stack, remote communication with AMT occurs via the network data path (e.g., before communication may be passed to the OS).

As an example, AMT out-of-band communication may be via wire or wireless (e.g., the Intel® AMT supports wired and wireless networks). For wireless devices on battery power, out-of-band communication may be available when the device is in an "awake" state, connected to a network (e.g., even if its OS is down). Out-of-band communication may also available for wireless or wired devices connected to a network over a host OS-based virtual private network (VPN) when awake and working properly.

As an example, AMT out-of-band secure communication may occur outside a firewall. For example, a secure communication tunnel may be established between a wired device and an IT console outside a firewall. In such a scheme, a management presence server (e.g., a "vPro-enabled gateway") may authenticate a device, open a secure TLS tunnel between the IT console and the device, and mediate communication. Such a scheme may help a user or device itself request maintenance or service, for example, when at a satellite office, etc., for example, where there is no on-site proxy server or management appliance. As an example, a device may include Intel® vPro technology or other technology that supports 802.1x, Cisco® Self-Defending Network, Microsoft® Network Access Protection, etc., for example, to access one or more resources in a secure network environment(s).

As an example, a device that includes AMT may store configuration information in protected memory (see, e.g., the isolated memory 132, particularly the specialized NVM 136). The information may include the name(s) of appropriate "whitelist" management servers (e.g., for a company, etc.). When a user tries to initiate a remote session between the wired AMT device and a server from an open LAN, AMT sends the stored information to a management presence server (MPS) in a so-called "demilitarized zone" that exists between the firewall and device's firewalls. The MPS can use such information to help authenticate the device. The MPS then mediates communication between the device and management servers.

Where communication is authenticated, a secure communication tunnel can then be opened using TLS encryption. Once secure communications are established between an IT console and Intel® AMT on a device, a system administrator may use the AMT features to remotely diagnose, repair, maintain, or update the device.

In the example of FIG. 1, the specialized NVM 136 may include information (e.g., instructions) for technology such as the Intel® AMT. As an example, a module may be loaded into the isolated memory 132, optionally the specialized NVM 136, for purposes of allowing access to one or more resources available on, through or on and through a system that includes components for out-of-band operations.

Figure 2:
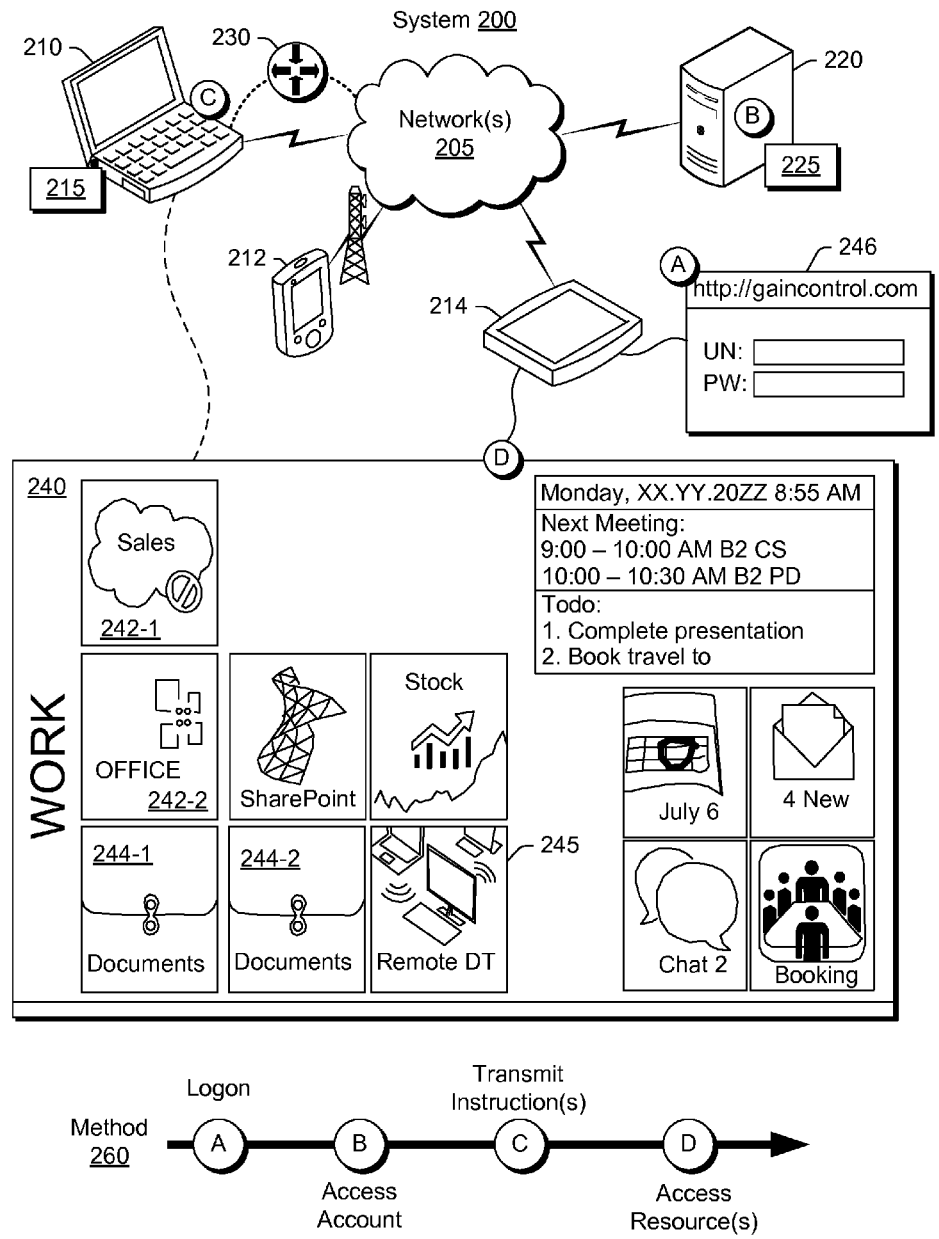
FIG. 2 is a diagram of an example of a system and an example of a method.

FIG. 2 shows an example of a system 200 with respect to one or more networks 205 for communication of information, for example, between a device 210, a device 212, a device 214 and a device 220. As an example, one or more firewalls and/or other network devices 230 may be included. In the example of FIG. 2, the network 205 may include one or more of the Internet (e.g., where communication occurs via one or more Internet protocols), a cellular network, a satellite network, etc. FIG. 2 also shows a method 260 along with labels A, B, C, and D.

As shown, the method 260 includes a logon process (A), for example, where a user on the device 214 accesses a webpage 246 via the one or more networks 205, for example, where the webpage 246 is hosted by or otherwise associated with a service 225 on the device 220 (e.g., a server, etc.). As an example, the device 214 may include a browser application that launches or is directed to a URL for the webpage 246. As an example, the device 210 may include code 215 associated with the service 225 on the device 220. As an example, the code 215 may be stored in non-volatile memory and may assist with an out-of-band communication mode. As an example, code 215 may be code for a filter (e.g., a flexible filter) and, for example, code to instruct the device 210 to read memory of a network adapter (e.g., an internal buffer) for stored data as included in a packet. Such data may indicate to the device what resource or resources may be made available via the network connection.

As shown, the webpage 246 may include fields for entry of a user name and a password to logon to the service 225 of the device 220. While the example of FIG. 2 shows the device 220 as a single unit, it may be composed of multiple units (e.g., a number of blades in a server farm). As an example, the device 220 may be a "cloud-based" device in a distributed environment where various devices, components, etc. interact for purposes of data storage, communications, computing, etc.

In the example of FIG. 2, the logon process (A) of the method 260 provides for accessing a user account (B) for the service 225 of the device 220. The user account can include information associated with the device 210, for example, to allow a user at the device 214 (e.g., or another device) to gain access to one or more resources available on, through or on and through the device 210. For example, the service 225 of the device 220 may transmit one or more instructions via the one or more networks 205 to the device 210 to commence an out-of-band process using code 215 to provide the user at the device 214 access to one or more resources available on, through or on and through the device 210. As to the method 260, a process labeled (C) represents transmission and receipt of one or more instructions and a process labeled (D) represents access to one or more resources.

As an example, a method can include receiving a request to access a specified resource associated with a user account and, in response to the request, transmitting, to a network address associated with the user account, instructions for waking a system or device from a sleep state and for accessing the specified resource. For example, the service 225 may receive a request to access a specified resource associated with a user account and, in response, the service 225 may call for transmitting, to a network address associated with the user account (e.g., a network address for the device 210), instructions for waking a system or device (e.g., the device 210) from a sleep state and for accessing the specified resource (e.g., a file, an application, an operating system, a peripheral, etc.).

In the example of FIG. 2, the user of the device 214 may gain access to one or more resources available on, through or on and through the device 210. As an example, access may be achieved, at least in part, by an out-of-band wake-up process, for example, when the device 210 is in a particular state (e.g., in one or more states of a group of states). For example, the device 210 may be plugged-in to an electrical power outlet (e.g., of a building, a vehicle, etc.) yet in a low power state that provides a limited supply of power for maintaining activity of a network adapter. Such activity may be sniffing activity that sniffs network packets for information such as a MAC address associated with the device 210. Upon discovery of such a packet (e.g., a type of "magic" packet), information in the module 215 may be implemented to "wake" the device 210 to a state that allows the user of the device 214 to access one or more resources.

In the example of FIG. 2, a desktop 240 is shown as including various desktop icons and other desktop information. For example, an icon 242-1 and an icon 242-2 are associated with applications (e.g., available as a resource to the user of the device 214). Also shown in the example of FIG. 2, a folder icon 244-1 and a folder icon 244-2, which may be associated with information (e.g., documents, etc.) available to the user of the device 214.

As an example, the system 200 may include one or more firewalls, etc. (see, e.g., the network device 230). As an example, a firewall may be configured for sniffing and associating an address with one or more resources behind the firewall (e.g., by applying one or more filters). In such an example, the firewall may act to direct traffic (e.g., packets, transmitted certificates, etc.) to appropriate destinations behind the firewall. In such an example, an out-of-band process may be performed on a device behind the firewall upon receipt of a packet of information (e.g., appropriate identifying information, instructions, etc.).

As an example, a firewall may be a network device that includes circuitry for various operations associated with traffic control (e.g., a network gateway server may be configured to function as a firewall). As an example, a firewall may include circuitry for stateful packet inspection (SPI), deep packet inspection (DPI), network address translation (NAT, e.g., to "hide" addresses of devices "behind" the firewall, which may be on a private network), etc.

As an example, a network device such as a firewall may include an inspection engine. In a so-called fast path, when a user establishes a connection, a packet may be checked against one or more access lists, if appropriate, address translation may occur and an entry made for a fast path session to allow further packets to bypass checks that may result in delays. As an example, an application may embed an IP address in the packet that should match a source address that is normally translated when it goes through a network device. In such an example, an inspection engine may translate an embedded address and update any checksum or other fields that may be affected by the translation. As an example, for a service that uses dynamically assigned ports, a network device may monitor a session to identify a dynamic port assignment and permit data exchange on such a port for duration of a session.

As an example, one or more devices may include circuitry for cellular communications (e.g., GSM, satellite, etc.). As an example, a network device may include a general packet radio service (GPRS) tunneling protocol (GTP) inspection engine. As an example, GPRS may provide for connectivity for mobile subscribers between one or more GSM networks and a corporate network, the Internet, etc. As an example, a network device (e.g., a gateway GPRS support node "GGSN") may be an interface for communications between a GPRS wireless data network and one or more other networks. Such a device may include an inspection engine for inspecting packets, for example, packets that may include information associated with a service such as the service 225.

Figure 3:
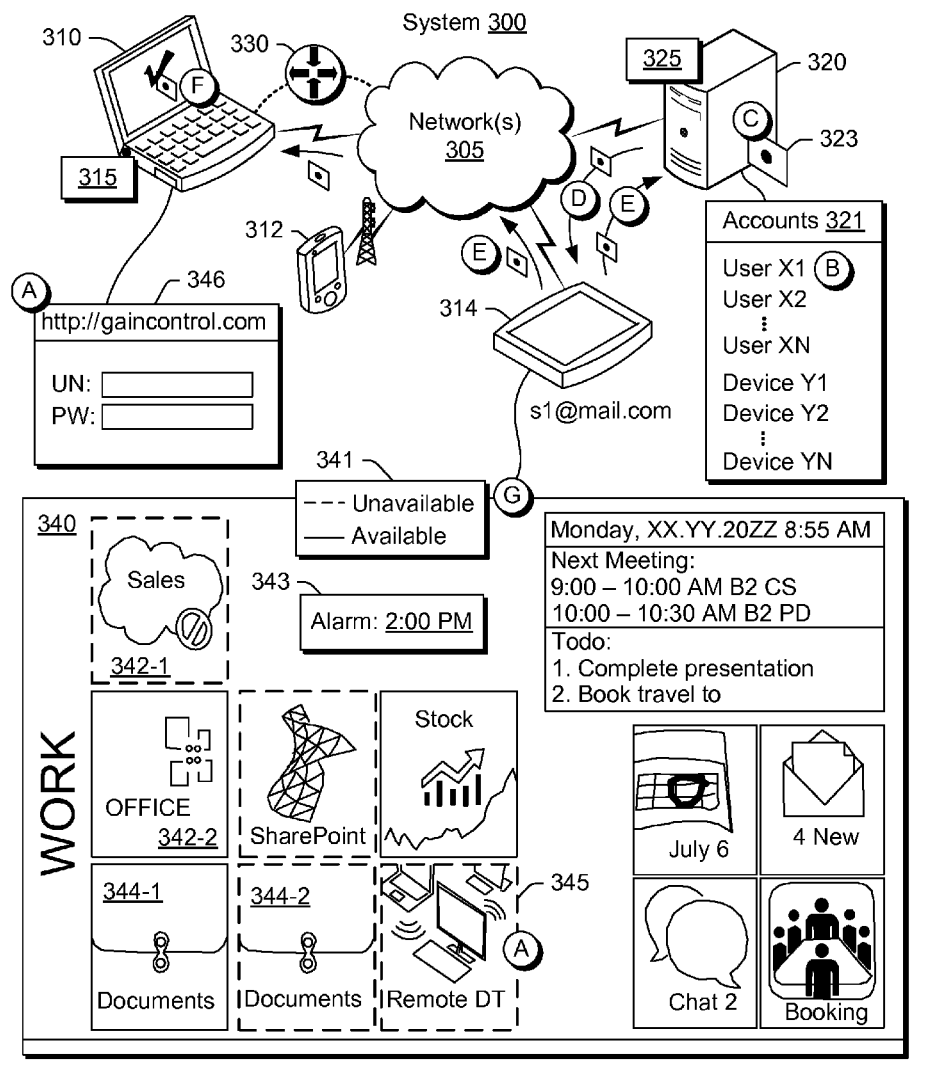
FIG. 3 is a diagram of an example of a system and an example of a method.
Figure 3:
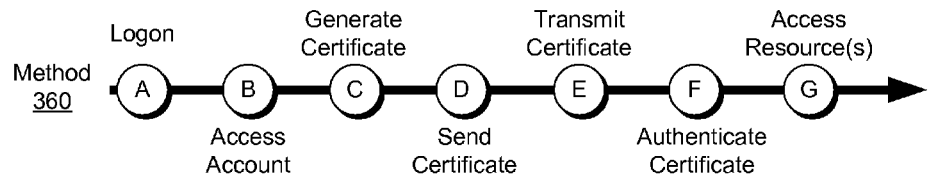

FIG. 3 shows an example of a system 300 with respect to one or more networks 305 for communication of information, for example, between a device 310, a device 312, a device 314 and a device 320. As an example, one or more firewalls and/or other network devices 330 may be included. In the example of FIG. 3, the network 305 may include one or more of the Internet (e.g., where communication occurs via one or more Internet protocols), a cellular network, a satellite network, etc. FIG. 3 also shows a method 260 along with labels A, B, C, D, E, F and G.

As shown, the method 360 includes a logon process (A), for example, where a user on the device 310 accesses a webpage 346 via the one or more networks 305, for example, where the webpage 346 is hosted by or otherwise associated with a service 325 on the device 320 (e.g., a server, etc.). As an example, the device 310 may include a browser application that launches or is directed to a URL for the webpage 346, for example, upon selection and activation of an icon such as the icon 345 (e.g., a desktop icon). In such an example, the icon 345 may include the web address (e.g., a URL) as well as other information, for example, for assisting with access to one or more resources available on or through the device 310 (e.g., one or more files, applications, printers, control systems, etc.). For example, the device 310 may include code 315 associated with the service on the device 320. As an example, the code 315 may be stored in non-volatile memory and may assist with an out-of-band communication mode. As an example, code 315 may be code for a filter (e.g., a flexible filter) and, for example, code to instruct the device 310 to read memory of a network adapter (e.g., an internal buffer) for stored data as included in a packet. Such data may indicate to the device what resource or resources may be made available via the network connection.

As shown, the webpage 346 may include fields for entry of a user name and a password to logon to the service 325 of the device 320. As an example, the webpage 346 may provide for loading a certificate or other credential to be authenticated prior to gaining access to one of a plurality of user accounts 321 associated with the service 325 on the device 320. While the example of FIG. 3 shows the device 320 as a single unit, it may be composed of multiple units (e.g., a number of blades in a server farm). As an example, the device 320 may be a "cloud-based" device in a distributed environment where various devices, components, etc. interact for purposes of data storage, communications, computing, etc.

In the example of FIG. 3, the logon process (A) of the method 360 provides for accessing a user account (B) for the service 325 of the device 320. In turn, the user may transmit one or more instructions from the device 310 via the one or more networks 305 to instruct the service 325 to generate a certificate 332, labeled as process (C) of the method 360. Further, the user may instruct the service 325 of the device 320 to send the certificate 332 to a particular address available via the one or more networks 305. For example, the device 320 may receive an instruction associated with a destination and then transmit the generated certificate 332 to that destination, labeled as process (D) in the method 360.

As an example, consider a user at the device 310 instructing the service 325 at the device 320 to send the certificate 332 to an email address "s1@mail.com". As shown, a user using the device 314 may receive the certificate 332 as an attachment to an email. In turn, the user may use the certificate 332 to gain access to one or more resources available on, through or on and through the device 310. For example, a recipient of the certificate 332 may transmit the received certificate 332 via the one or more networks 305 to the device 320 hosting the service 325 or to the device 310, in either instance, to ultimately gain access to one or more resources available on, through or on and through the device 310. As shown, for the method 360, the transmission process is labeled as process (E). In the former, the device 320 may be a primary mediator for access (e.g., to authenticate all or a portion of the certificate, the transmitter's address, etc.) while in the latter, the device 310 may be configured to allow access, optionally without further involvement from the device 320 (e.g., or any other device associated with the service 325).

As an example, the device 310 may be configured to authenticate the certificate 332, for example, as part of an out-of-band process (e.g., in a secure manner that does not include accessing an operating system). In such an example, authentication may be performed wholly on the device 310 or optionally, at least in part, via an authentication party, for example, accessible via the one or more networks 305. As shown, for the method 360, the authentication process is labeled as process (F).

Upon authentication of the certificate 332, the user of the device 314 may gain access to one or more resources available on, through or on and through the device 310. As an example, access may be achieved, at least in part, by an out-of-band wake-up process, for example, when the device 310 is in a particular state (e.g., in one or more states of a group of states). For example, the device 310 may be plugged-in to an electrical power outlet (e.g., of a building, a vehicle, etc.) yet in a low power state that provides a limited supply of power for maintaining activity of a network adapter. Such activity may be sniffing activity that sniffs network packets for information such as a MAC address associated with the device 310. Upon discovery of such a packet (e.g., a type of "magic" packet), information in the module 315 may be implemented to "wake" the device 310 to a state that allows the user of the device 314 to access one or more resources, which may be specified in information included with the certificate 332 or, for example, optionally pre-specified on the device 310 (e.g., according to a policy, a registry for users, permissions, etc.). As shown, for the method 360, the access process is labeled as process (G).

In the example of FIG. 3, a desktop 340 is shown as including various desktop icons and other desktop information. For example, an icon 342-1 is associated with an application that is unavailable as a resource to the user of the device 314 while an icon 342-2 is associated with an application that is available as a resource to the user of the device 314. Also shown in the example of FIG. 3, a folder icon 344-1 is associated with information (e.g., documents, etc.) that is available to the user of the device 314 while a folder icon 344-2 is associated with information (e.g., documents, etc.) that is unavailable to the user of the device 314. To assist a "remote" user, the desktop 340 may include a graphic 341 that indicates availability, unavailability or both of one or more resources (see, e.g., dashed lines of unavailable and solid lines for available).

In the example of FIG. 3, one or more resources are available (or unavailable) to a proper holder of the certificate 332. Accordingly, while the example of FIG. 3 shows the device 314 as transmitting the certificate 332, a user may forward the certificate 332, for example, to the device 312 such that the device 312 may access one or more resources available on, through or on and through the device 310. As an example, such forwarding may be restricted, for example, where authentication of the certificate 332 depends on information of the transmitter (e.g., requester). For example, the certificate 332 may include one or more geographic conditions that restrict authentication to devices with addresses in a certain country or countries.

In the example of FIG. 3, the desktop 340 may include a notification graphic 343. For example, where access is restricted based on time, the notification graphic 343 may be an alarm graphic that indicates when access will be terminated. As an example, such a graphic may provide a graphical user interface to communicate with an "owner" of the device 310, for example, to modify, shorten or extend a "session". Consider a remote user that needs more time to complete a task. In such an example, the user may activate a GUI for issuing a request to extend a time period. In turn, the owner may intervene, for example, by logging on to the service 325 and issuing a new or a supplemental certificate, which may optionally be transmitted directly to the device 310 (e.g., via the one or more networks 305). Such an example may correspond to a "super-user" override mode of the service, which may operate in near real-time to modify, shorten, extend, etc., one or more conditions.

As an example, the system 300 may include one or more firewalls, etc. As an example, a firewall may be configured for sniffing and associating an address with one or more resources behind the firewall. In such an example, the firewall may act to direct traffic (e.g., transmitted certificates) to appropriate destinations behind the firewall. In such an example, an out-of-band process may be performed on a device behind the firewall upon receipt of a packet of information (e.g., a certificate, etc.). As an example, an authentication process may optionally be performed at a firewall. In such an example, an authenticated certificate may be transmitted to an appropriate device behind the firewall to perform an out-of-band process that allows for access to one or more resources, for example, as specified in the certificate or as otherwise specified. In such an example, a plurality of devices may exist behind the firewall where each of such devices may have permission to access one or more specified resources (e.g., access to the one or more specified resources via one of a group of "generic" devices).

As an example, consider data as a resource where the data is stored in one or more storage devices behind a firewall. In such an example, front-end device (e.g., a firewall or other device) may perform an authentication process on a certificate and then direct the certificate to a device that is in a low power state (e.g., a sleep state, even a powered-off state where some power is available to a network adapter) such that an out-of-band process may be performed to "activate" the device for accessing the data as stored in one or more of the one or more storage devices.

Figure 4:
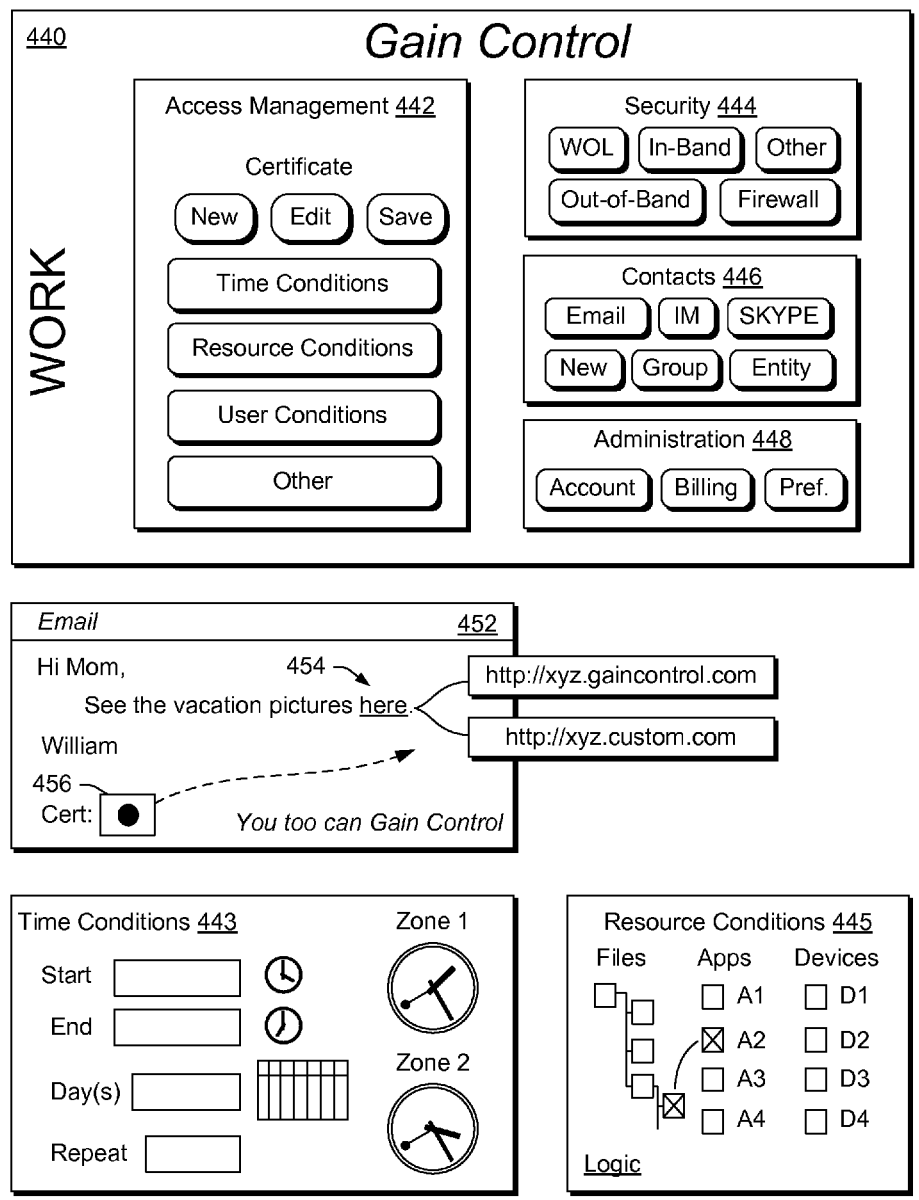
FIG. 4 is a diagram of examples of graphical user interfaces.

FIG. 4 shows an example of a graphical user interface (GUI) 440 as associated with a service such as the service 325 of the system 300 of FIG. 3. In the example of FIG. 4, the GUI 440 includes an access management graphic 442, a security graphic 444, a contacts graphic 446 and an administration graphic 448. Each of the graphics 442, 444, 446 and 448 may be rendered to a display by a device, for example, as part of a webpage or webpages (e.g., in a browser application).

The access management graphic 442 includes graphical controls for executing various instructions to manage a certificate. For example, a user may create a new certificate, edit an existing certificate, save a certificate, etc. Further, in the example of FIG. 4, a user may optionally specify one or more of time conditions, resource conditions, user conditions and/or other conditions.

The security graphic 444 includes graphical controls for executing various instructions for wake on LAN (WOL), in-band, out-of-band, firewall, and/or other types of communication related processes. For example, a user may select a "firewall" button and indicate that a device exists behind a firewall and that a certificate may be configured, routed, etc., to handle access to the device behind the firewall.

As an example, a user may select one or more types of communication, for example, optionally depending on knowledge of a state or states of a device. For example, if a device is "on" during certain hours, a certificate may call for an in-band process; whereas, if the device is "off" during other hours, a certificate (e.g., possibly the same certificate) may call for an out-of-band process. In such a manner, a certificate may be tailored to knowledge about a device. As another example, a hierarchy may be established where a first type of communication is attempted (e.g., in-band) followed by a back-up type (e.g., out-of-band).

The contacts graphic 446 includes various graphical controls for accessing, selecting, managing, etc., contacts. As an example, a certificate may be associated with an email, an IM ID, a SKYPE® ID (Microsoft Corp., Redmond, Wash.), a new contact, a group contact, an entity contact, etc. As to an entity contact, it may refer to a device, a system, etc. For example, "my car" may be a contact where the car includes a system that may be in a sleep state and subject to wake-up via an out-of-band process. As another example, consider a production facility with process control equipment where a controller may be in a sleep state. Such a controller may be considered an entity and capable of being woken-up via a process such as an out-of-band process.

As an example, a contact may be associated with contact information for contact via one or more networks such as, for example, including the Internet (e.g., where communication occurs via one or more Internet protocols), a cellular network, a satellite network, etc. As an example, a message may be communicated via a cellular network to a smart phone, a tablet, a notebook computer, a vehicle, a controller, etc. As an example, a device may include a cellular network interface (e.g., network adapter), which may be configured for operation in a low power state and upon receipt of one or more packets wake to allow for remote access to one or more resources available on, through or on and through the device.

The administrative graphic 448 includes graphical controls for managing an account, billing, preferences, etc. Such graphical controls may allow a user to set permission, conditions, etc.

FIG. 4 shows an example of an email 452 that includes a link 454 and optionally a certificate 456. In this example, a message reads in part "Hi Mom, See the vacation pictures here". In such an example, the recipient of the email 452 may select the link (e.g., the word "here") to launch a remote session to a device to access one or more resources available on, through or on and through the device. As an example, the link may be a URL to a service (e.g., an account associated with the service) or to a device. In either instance, a certificate such as the certificate such as the certificate 456 may be transmitted to the URL or otherwise implemented to gain access.

FIG. 4 also shows an example of a graphical user interface (GUI) 443 for setting one or more time conditions. For example, the GUI 443 may include a start field, an end field, a day(s) field, and a repetition/frequency field. As an example, graphical controls may be provided to assist with entry of information in such fields. As an example, graphical controls may be provided to indicate one or more time zones (e.g., to facilitate setting time conditions for certificate recipients/users in a different time zone).

FIG. 4 also shows an example of a graphical user interface (GUI) 445 for setting one or more resource conditions. For example, the GUI 445 may include a files graphical control, an applications graphical control, and a devices graphical control. A graphical control may also be provided for logic. For example, where a file has a particular file extension associated with an application, selection of the file may automatically select the associated application. In such a manner, a remote user can access the file and use the file on a device, which may be awoken from a sleep state, for example, via an out-of-band process. Referring again to the desktop 340 of FIG. 3, the GUI 445 may optionally be implemented to determine which icons and associated resources are available (e.g., or unavailable).

Figure 5:
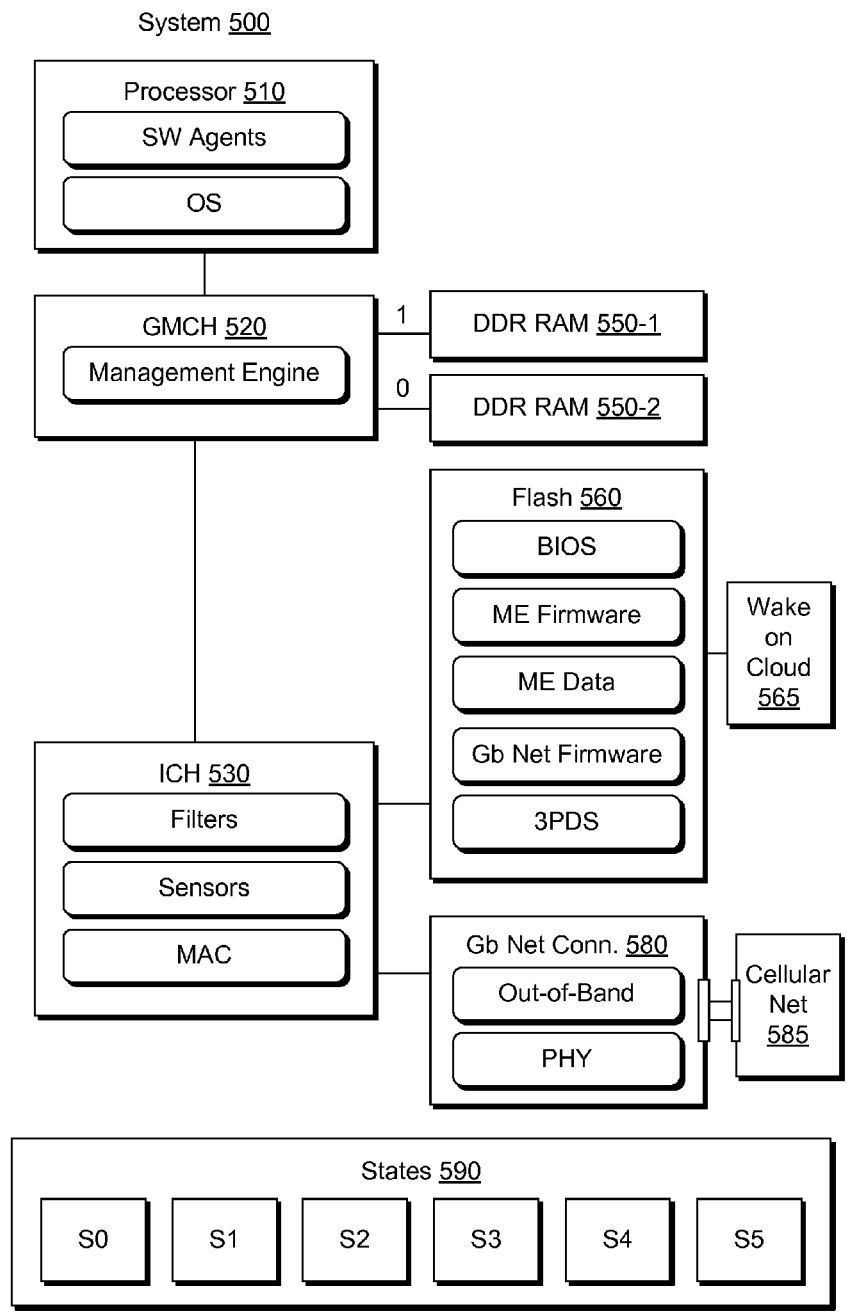
FIG. 5 is a diagram of an example of a system.

FIG. 5 shows an example of a system 500 according to an architecture that includes a processor 510, a graphics memory controller hub (GMCH) 520 and an I/O controller hub (ICH) 530 as well as memory such as DDR2 RAM 550 and flash memory 560, and a network connector 580. In the example of FIG. 5, a cellular network connector 585 may be included alternatively or additionally to the network connector 580. As an example, the cellular network connector 585 may include a connection to the network connector 580. As an example, an out-of-band process may optionally be initiated via a communication received via the cellular network connector 585. For example, the cellular network connector 585 may sniff packets for particular identifying information (e.g., consider a 3G, 4G, etc., cellular network sniffer).

As shown, the GMCH 520 includes a management engine (ME) that can operate according to ME firmware stored in the flash memory 560. AMT functionality may be provided according to instructions of the ME firmware (e.g., a firmware image as stored in the flash memory 560).

As an example, instructions 565 may be included in the flash memory (e.g., to supplement ME firmware) to provide functionality for purposes of a method such as the method 260 of FIG. 2, the method 360 of FIG. 3, etc. As an example, such instructions may be implemented as part of an OEM platform. Such functionality may be enabled using a ME BIOS extension such that remote access may occur. In the example of FIG. 5, the instructions 565 are shown as being "wake on cloud" instructions, which may, for example, allow for waking the system 500 from a sleep state or, more generally, transitioning the system 500 from a higher state (less power) to a lower state (more power) and optionally vice-versa (e.g., at the end of a session, expiration of a certificate, etc.).

As an example, on power-up, the ME firmware image in the flash memory 560 may be copied into the DDR RAM 550-1 or 550-2. The ME firmware may execute on the processor 510, for example, and use a portion of the DDR RAM (e.g., Slot 0) for storage during execution. In such an example, DDR RAM Slot 0 must be populated and powered on for the ME firmware to run.

As to the ME data, it may include, for example, OEM-configurable parameters; setup and configuration parameters such as passwords, network configuration, certificates, and access control lists (ACLS); other configuration information, such as lists of alerts and System Defense policies; and a hardware configuration captured by the BIOS at startup.

As an example, AMT functionality may manage third-party data storage (3PDS), for example, which may be allocated by independent software vendor (ISVs) for local storage of information for their applications.

As shown in the example of FIG. 5, the flash memory 560 also includes BIOS executable code and executable code ("Gb Net Firmware") for the Gigabit Network Connection 580.

As an example, the flash memory 560 may be protected against unauthorized host access by a hardware mechanism activated by an OEM during manufacturing.

As an example, the ICH 530 may include filter definitions that are applied to incoming and outgoing in-band network traffic (e.g., message traffic to and from the processor 510). As an example, such filters may include internally-defined filters and one or more application filters defined by one or more ISVs using system defense and agent presence capabilities.

In the example of FIG. 5, the Gigabit Network Connection 580 may be configured to identify out-of-band (OOB) network traffic (e.g., traffic targeted to AMT, etc.) and routes it to the ME instead of to the processor 519. As an example, AMT traffic may be identified by dedicated IANA-registered port numbers.

As an example, the following may interact with AMT:

BIOS to initialize AMT or to reset it to its initial state. For example, it may capture platform hardware configuration information and stores it in NVM so that AMT can make the information available out-of-band.

ICH 530 sensor capability to detect state of various platform sensors, such as, for example, temperatures, fan status, and chassis integrity. As an example, AMT may be configured to store and/or forward an alert when the state of any selected sensor changes or crosses a threshold.

One or more software agents (e.g., written by a management ISV) executing on the processor 510 may register with AMT and report presence to AMT and, for example, to a management console using "heartbeats". In such an example, AMT may monitor heartbeats and take action when there is a problem with agent execution.

ISV applications on the processor 510 may communicate locally with AMT using dedicated drivers, for example, that are compatible with the host operating system.

The system 500 may be a state machine and exist in a state such as one of the states 590. In the example of FIG. 5, the states are number S0, S1, S2, S3, S4 and S5. These may be referred to as "sleep states" that describe power applied to the processor 510. A sleep state may relate to one or more particular hardware components. Where the system 500 is considered to be fully powered up, it is said to be "in S0"; whereas, if the system 500 is in some higher sleep state (i.e., lower power state), it is "in Sx".

As an example, the Advanced Configuration and Power Interface (ACPI) specification defines the following states G0 (S0), G1 (S1-S4) and G2 (S5):

G0 (S0): Working

G1, Sleeping subdivided into four states S1 through S4:

S1 Sleeping State: The S1 sleeping state is a low wake latency sleeping state. In this state, no system context is lost (processor or chipset) and hardware maintains all system context.

S2 Sleeping State: The S2 sleeping state is a low wake latency sleeping state. This state is similar to the S1 sleeping state except that the processor and system cache context is lost (e.g., OS is responsible for maintaining the caches and processor context). Control starts from the processor's reset vector after the wake event.

S3 Sleeping State: The S3 sleeping state is a low wake latency sleeping state where all system context is lost except system memory. Processor, cache, and chipset context are lost in this state. Hardware maintains memory context and restores some processor and L2 configuration context. Control starts from the processor's reset vector after the wake event.

S4 Sleeping State: The S4 sleeping state is the lowest power, longest wake latency sleeping state supported by ACPI. To reduce power to a minimum, it is assumed that the hardware platform has powered off all devices. Platform context is maintained.

G2 (S5) Soft Off State: The S5 state is similar to the S4 state except that the OS does not save any context. The system is in the "soft" off state and requires a complete boot when it wakes. Software uses a different state value to distinguish between the S5 state and the S4 state to allow for initial boot operations within the BIOS to distinguish whether or not the boot is going to wake from a saved memory image.

As mentioned, the instructions 565 as stored in the flash memory 560 may be implemented to transition the system 500 from one state to another state. For example, the instructions 565 may be implemented with Intel® AMT to allow for one or more "wake on cloud" scenarios. As explained with respect to the method 260 of FIG. 2, such a transition may occur in response to a packet from the "cloud", for example, as provided by a cloud-based service 225. In such an example, the device 220 may be referred to as a cloud connector as it allows a device to connect to another device through the cloud. As an example the service 225 may be referred to as a cloud connector service.

As explained with respect to the method 360 of FIG. 3, such a transition may occur in response to a packet from the "cloud", for example, as provided by a cloud-based service 325. In the example of FIG. 3, a certificate may be provided that includes information as to one or more conditions (e.g., restrictions, etc.), for example, as explained with respect to the example of FIG. 4.

As explained with respect to FIG. 1, in various states, power is supplied to a network adapter to allow it to perform functions such as, for example, sniffing. In such an example, sniffing may be specific for one or more packets originating with a cloud-based service (e.g., a cloud-based connector service). As an example, a cloud-based service may optionally include cellular network equipment for communications over a cellular network. In such an example, a cellular network connector (e.g., adapter) may be provided such as, for example, the cellular network connector 585 of FIG. 5, which may include sniffing capabilities to monitor packets for identifying information associated with a system such as the system 500 of FIG. 5.

As an example, a packet may include information such as data that may, for example, be loaded into flash or other memory to instruct a system upon waking to a lower state (e.g., to the G0 (S0) working state). The data may cause an operating system to restrict access to one or more resources, allow access to one or more resources, etc. Some examples of resources are shown, for example, with respect to the resource conditions graphic 445 of FIG. 4.

Figure 6:
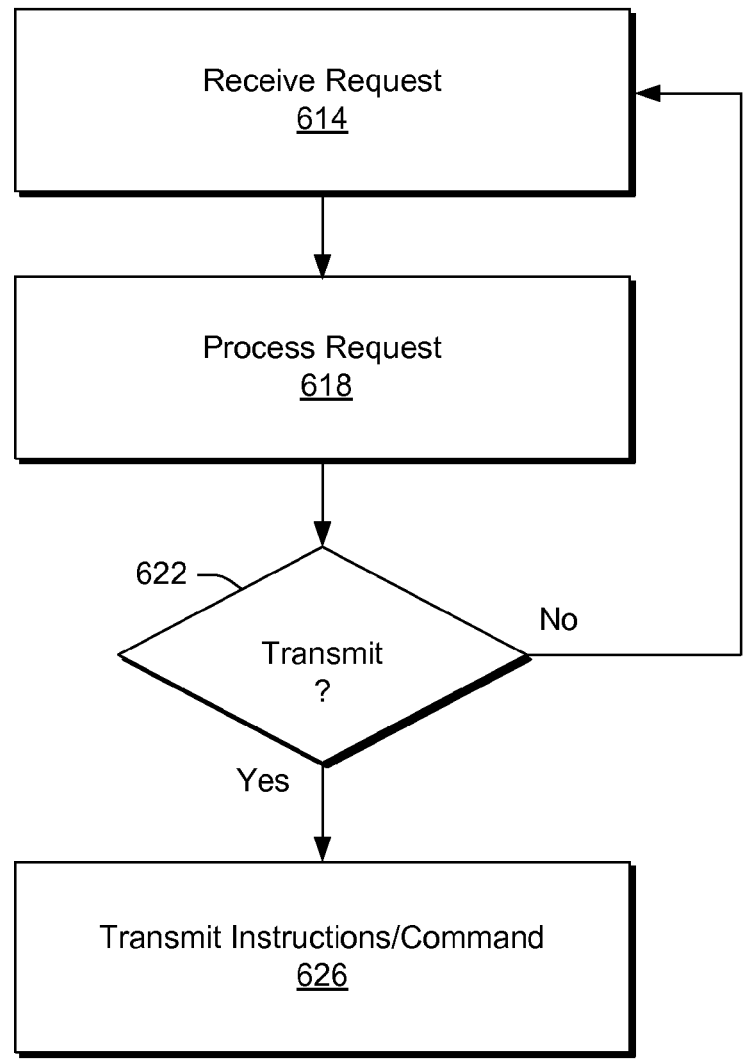
FIG. 6 is a diagram of an example of a method.

FIG. 6 shows an example of a method 600 that includes a reception block 614 for receiving a request via a network interface to access a specified resource associated with a user account; a process block 618 for processing the request received via the network interface to access a specified resource associated with a user account; a decision block 622 for deciding whether to transmit, to a network address associated with the user account, instructions (e.g., commands) for waking a processor from a sleep state and for accessing the specified resource; and a transmission block 626 for, responsive to a decision to transmit the instructions (e.g., commands), transmit the instructions (e.g., commands) via the network interface. In the instance that the decision block 622 decides that transmission is not proper, the method 600 may continue, for example, to the reception block 614 (e.g., to wait for receipt of a request).

As an example, one or more blocks of the method 600 of FIG. 6 may be in the form of one or more computer-readable media that include instruction executable by a processor to instruct an information handling system to process a request to access a specified resource associated with a user account; and to decide whether to transmit, to a network address associated with the user account, instructions (e.g., commands) for waking a processor from a sleep state and for accessing the specified resource. As an example, a server may be an information handling system (see, e.g., the device 220 of FIG. 2, the device 320 of FIG. 3, etc.).

As an example, a system may include a processor; a memory device having memory accessible by the processor; a network interface; and instructions stored in the memory and executable by the processor to process a request received via the network interface to access a specified resource associated with a user account; decide whether to transmit, to a network address associated with the user account, commands for waking a processor from a sleep state and for accessing the specified resource; and responsive to a decision to transmit the commands, transmit the commands via the network interface. As an example, such a system may be a server. As an example such a system may be a cloud-based server and, for example, may be referred to as a cloud connection server or, for example, a cloud connector.

Figure 7:
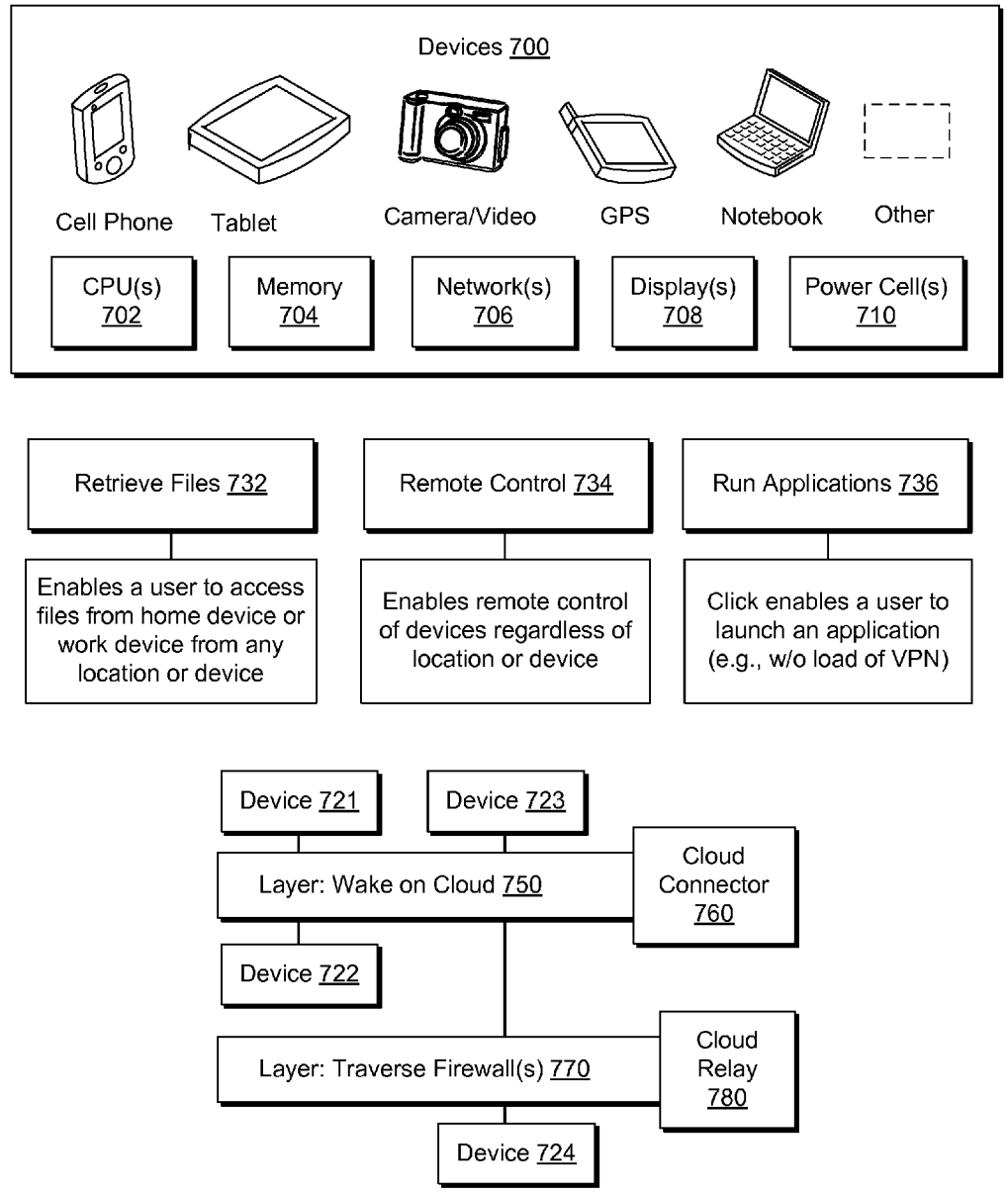
FIG. 7 is a diagram of examples of devices, functional blocks and an architecture that includes a wake on cloud layer and a firewall traversal layer.

FIG. 7 shows some examples of devices 700, examples of functionality 732, 734 and 736 and an example of an architecture that includes a wake on cloud layer 750 and a transverse firewall layer 770. As shown, the devices 700 may include one or more processors 702, memory 704, one or more network interfaces 706, one or more displays 708 and one or more power cells 710. As shown in FIG. 7, for example, a cell phone, a tablet, a camera, a GPS device, a notebook computer, or other device may be configured for use with the layer 750 or the layers 750 and 770, for example, to perform one or more functions such as, for example, the retrieving files functionality 732, the remote control functionality 734 and running applications functionality 736.

In the example of FIG. 7, the layers 750 and 770 are shown with respect to a cloud connector 760 and a cloud relay 780, respectively. Also shown are devices 721 and 722 and devices 723 and 724, where the former pair communicate via the wake on cloud layer 750 (e.g., implemented via the cloud connector 760) and the latter pair communicate via the wake on cloud layer 750 (e.g., implemented via the cloud connector 760) and the firewall transversal layer 770 (e.g., implemented via the cloud relay 780).

As an example, the architecture of FIG. 7 may operate without a need for a connector application or agent on a requesting device. For example, the device 721 and the device 723 may request one or more resources of the device 722 and the device 724, respectively, via a commercially available browser application (e.g., without a specialized connector application or agent on the device 721 or the device 723).

As an example, the device 723 may communicate with the device 724 by traversing a firewall, for example, without having to establish a connection such as a VPN connection.

As an example, the device 721 and the device 723 may operate through the cloud connect 760 or the cloud connector 760 and the cloud relay 780 to wake a remote device through the cloud (e.g., the device 722 or the device 724, either of which may be in a sleep state). As an example, a request may result in an application being automatically launched on a remote device. For example, the device 721 may issue a request to access an application on the device 722 where the request causes the application to launch on the device 722 (e.g., to be ready for use by a user at the device 721).

As an example, a method may include waking a remote device and accessing its resources, such as retrieving files, remotely controlling, and/or remotely launching and controlling applications, from an external device via a browser interface when the remote device is in a low power consumption state (e.g., a power consumption level such as that to power a network adapter such as an on-board network adapter) and behind a firewall.

As an example, a system may allow a person who is not at his or her primary or secondary compute device but needs a file, or information, or needs to run a program that is only installed on one of his or her other compute devices located behind one or more firewalls. As an example, the person may be on another compute device they own, or a 3rd party compute device that they are a guest on. As an example, a system may allow a person to remotely wake up a device and securely gain control of that device from a 3rd party compute device.

As an example, a method may include waking up, tunneling though firewalls and wireless access points, understanding a changing IP address of a compute device, and one or more other tasks.

As an example, a wake on cloud service may allow a user to securely register one or more devices (see, e.g., the devices 700 of FIG. 7) with a secure registered cloud server to enable a secure remote wake up (e.g., and remote control) of a device from a browser inside or outside a firewall.

As an example, a cloud connector may be a centralized management console. Such a console may be an intermediate entry point for users to gain access and control of their devices. As an example, such a console may include a fixed URL (e.g., www.gaincontrol.com). As an example, a user may access such a site from a browser application (e.g., executing on suitable device). As an example, a user may logon to his or her account using an industry standard logon procedure. As an example, a user account may include information to gain control of one or more devices specified in the user account (e.g., where each of the devices is suitable enabled).

As an example, a device or client may include a second processor subsystem such as, for example, the Intel® ME subsystem. The Intel® ME may be configured to be operational in various states such that it can respond to packets sent to it from a centralized management console (e.g., a cloud connector) and, for example, to wake a device from various sleep states. As an example, updates may occur and be tracked by the Intel® ME subsystem as to IP address updates, for example, as a device or devices behind a wireless access point or a home router may be periodically assigned new IP addresses. As an example, a management engine such as the Intel® ME may be aware every time it gets a new IP address. In such a system, when an IP address changes for a device, a management engine may send a secure packet to a centralized management counsel (e.g., a cloud connector) to inform the centralized management counsel of a current IP address for the device.

As an example, a packet may be transmitted to a centralized management counsel (e.g., a cloud connector) from a device that includes a unique identifier for a management engine of the device (e.g., which may be a MAC address, a UUID, etc.) and a current IP address. With such information, a centralized management console (e.g., a cloud connector) may be informed to as to how to contact the device. As an example, a centralized management console may include a table for user accounts and one or more devices for each user account where, upon receipt of a packet, the centralized management console updates the table (e.g., updates a table entry for that compute device with the current IP address).

As an example, a compute device may also have an IP address different from a management engine of the device, which may change periodically (e.g., per a policy, etc.). As an example, the compute device may update a centralized management console (e.g., a cloud connector) responsive to each IP address transition (e.g., for storage by the centralized management console).

As an example, a user account may include a compute device name, an IP address of a secondary "always on" subsystem (e.g., Intel® ME or other), and, for example, an IP address of the compute device. Once a user logs on to a centralized management console (e.g., a cloud connector), the user may indicate which of his or her compute devices (e.g., if more than one is registered) he or she wishes to remotely control. In such an example, the centralized management console (e.g., the cloud connector) may send a request to the device (e.g., to a management engine of the device) where the device (e.g., the management engine) recognizes the request as being associated with the centralized management console (e.g., the cloud connector) and acts on the request by waking up the device. As an example, if one or more credentials may be required to tunnel through a firewall or a router (e.g., a network device, etc.), a centralized management console (e.g., a cloud connector) may be, for example, pre-initialized with such one or more credentials, which may be sent in a packet to a targeted device.

As an example, when a device wakes up it may update its IP address, as appropriate, to a centralized management console (e.g., cloud connector) and proceed with a system boot (e.g., to a state S0). As an example, a management engine may be configured to securely redirect keyboard, video, etc. to a centralized management console (e.g., a cloud connector). For example, the Intel® AMT may provide for such functionality.

As an example, a centralized management console (e.g., a cloud connector) may store logon/pw information for a compute device and remotely send that information to a management engine of a device. In turn, the management engine may emulate a keyboard and enter the logon/pw to complete a system boot (e.g., or appropriate state transition).

As an example, upon a state transition (e.g., a system boot or other wake-up procedure), a centralized management console (e.g., a cloud connector) may transmit to the device the IP address of a 3rd party device so the device can set up a direct connection with the 3rd party device thereby removing the centralized management console (e.g., the cloud connector) from the communication link. In such an example, once the link is established without the central management console being an intermediate party, the 3rd party may, for example, do a remote takeover of the device and access any information and/or run any program from the device (e.g., optionally using a remote desktop protocol such as RDP).

As an example, a cloud connector (e.g., or centralized management console, etc.) may implement a method that can include receiving a request to access a specified resource associated with a user account and, in response to the request, transmitting, to a network address associated with the user account, instructions for waking a system or device from a sleep state and for accessing the specified resource. In such an example, the specified resource may be an application and, for example, the instructions may include an instruction for launching an instance of the application. As an example, a specified resource may be a file, a folder or other resource (e.g., associated with a data storage system, hierarchy, etc.).

As an example, a method may include transmitting information to a firewall configured for granting access to a system or device based at least in part on checking a received network address against a stored network address. In such an example, the information may be in the form of a data packet that includes a network address and, for example, one or more instructions (e.g., one or more instructions for waking a system or device from a sleep state).

As an example, a request may include a certificate, for example, where transmission of the request is contingent on authentication of the certificate. In such an example, the certificate may include one or more restrictions (e.g., conditions, etc.) such as, for example, a time restriction.

As an example, a method can include waking from a sleep state that is defined, at least in part, by power consumption (see, e.g., sleep states such as "SX" states). As an example, a sleep state may be a state where a system or device has power supplied to a network adapter while other circuitry is not supplied by power. In such an example, the network adapter may be configured for sniffing and, in response to such sniffing, issue a command to transition the other circuitry from an off state to an on state (e.g., in part by causing power to be supplied to the other circuitry). As an example, a sleep state may have a low level of power consumption, for example, less than approximately 200 mW as supplied to a network adapter to perform sniffing (e.g., data packet inspection).

As an example, a method can include receiving a unique identifier associated with a system or device. As an example, a method can include receiving an updated network address to update a network address associated with a user account. As an example, a method can include receiving a secure packet that includes a unique identifier associated with a system or device and an updated network address to update the network address associated with the user account.

As an example, one or more computer-readable storage media can include processor-executable instructions to instruct a processor to: process a request to access a specified resource associated with a user account and decide whether to transmit, to a network address associated with the user account, commands for waking a processor from a sleep state and for accessing the specified resource. As an example, instructions to decide whether to transmit the commands may include instructions to decide based at least in part on authentication of a certificate. As an example, instructions to transmit the commands in response to authentication of the certificate.

As an example, a system may be a server such as a cloud server configured to provide a service. As an example, a system may include a processor, a memory device having memory accessible by the processor, a network interface and instructions stored in the memory and executable by the processor to process a request received via the network interface to access a specified resource associated with a user account, decide whether to transmit, to a network address associated with the user account, commands for waking a processor from a sleep state and for accessing the specified resource and responsive to a decision to transmit the commands, transmit the commands via the network interface. In such an example, a network interface may be a component such as a network adapter. As an example, instructions may be included to subject a certificate received with a request to an authentication process (e.g., to make a decision based at least in part on the authentication process).

As an example, a system may include instructions to render a graphical user interface in response to receipt of a request to access a user account. In such an example, the graphical user interface may include one or more control graphics for generating a certificate that includes one or more restrictions (e.g., conditions, etc.) that restrict access to the specified resource.

As an example, a device may include a hypervisor, for example, executable to manage one or more operating systems. With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
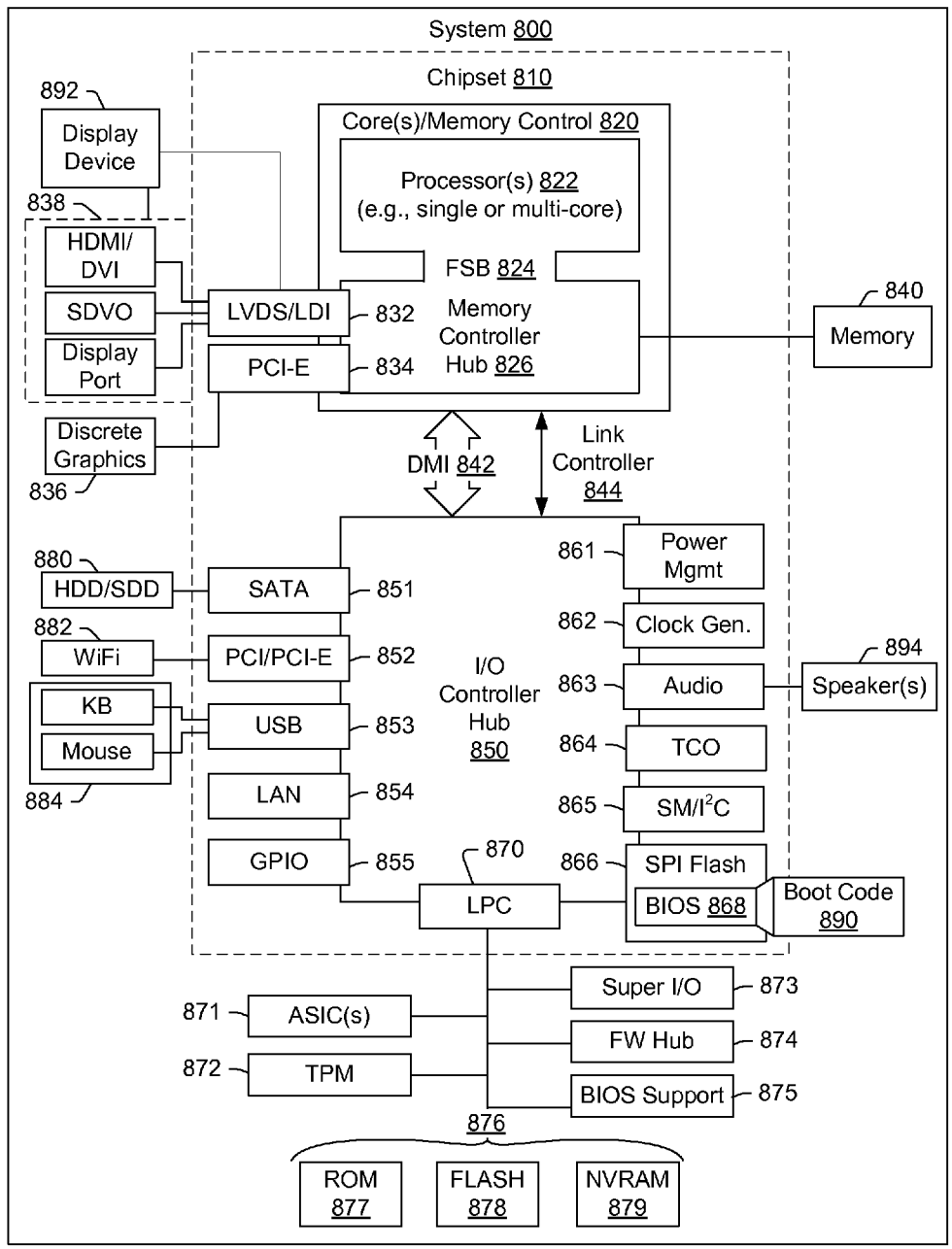
FIG. 8 is a diagram of an example of a machine, some or all of the features thereof may form part or all of a client, a server or other device or system.

While various examples circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands Intel®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879.

With respect to the TPM 872, this module may be in the form of a chip that can be used to authenticate software and hardware devices. For example, a TPM may be capable of performing platform authentication and may be used to verify that a system or component seeking access is the expected system or component.

The system 800, upon power on, may be configured to execute boot code 890 for the BIOS 868, as stored within the SPI Flash 866, and thereafter processes data under the control of one or more operating systems and application software (e.g., stored in system memory 840).

As an example, the system 800 may include circuitry for communication via a cellular network, a satellite network or other network. As an example, the system 800 may include battery management circuitry, for example, smart battery circuitry suitable for managing one or more lithium-ion batteries.

Conclusion

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising: receiving a request at a server to access a specified resource associated with a user account wherein the request comprises a certificate; authenticating the certificate; in response to the request and authentication of the certificate, accessing instructions from memory associated with the server and transmitting the instructions to a network address associated with the user account, wherein the instructions comprise instructions for waking a computing system or device from a sleep state and for accessing the specified resource, wherein the specified resource comprises an application and wherein the instructions comprise an instruction for launching an instance of the application within an operating system environment of the computing system or device woken from the sleep state.

2. The method of claim 1 wherein the application comprises an executable file.

3. The method of claim 1 wherein the transmitting comprises transmitting to a firewall configured for granting access to a system or device based at least in part on checking a received network address against a stored network address.

4. The method of claim 1 wherein the certificate comprises one or more restrictions.

5. The method of claim 4 wherein the one or more restrictions comprise a time restriction.

6. The method of claim 1 wherein the sleep state comprises a sleep state defined by power consumption.

7. The method of claim 1 comprising receiving a unique identifier associated with the system or device.

8. The method of claim 1 comprising receiving an updated network address to update the network address associated with the user account.

9. The method of claim 1 comprising receiving a secure packet that comprises a unique identifier associated with the system or device and an updated network address to update the network address associated with the user account.

10. The method of claim 1 wherein the application comprises at least one file extension that associates files with the application.

11. The method of claim 1 wherein the instructions for waking the system or device from the sleep state comprise at least one instruction for establishing an operating system environment by the system or device.

12. One or more non-transitory computer-readable storage media comprising processor-executable instructions to instruct a processor to: process a request to access a specified resource associated with a user account wherein the request comprises a certificate; based at least in part on an attempt to authenticate the certificate, decide whether to transmit, to a network address associated with the user account, commands for waking a processor from a sleep state and for accessing the specified resource; and responsive to a decision to transmit the commands, transmit the commands via a network interface, wherein the specified resource comprises an application and wherein the commands comprise a command for launching an instance of the application within an operating system environment established at least in part by the processor woken from the sleep state.

13. The one or more non-transitory computer-readable storage media of claim 12 wherein the certificate comprises one or more restrictions.

14. The one or more non-transitory computer-readable storage media of claim 13 wherein the one or more restrictions comprise a time restriction.

15. A system comprising:
a processor;
a memory device having memory accessible by the processor;
a network interface; and
instructions stored in the memory and executable by the processor to process a request received via the network interface to access a specified resource associated with a user account wherein the request comprises a certificate;
based at least in part on an attempt to authenticate the certificate, decide whether to transmit, to a network address associated with the user account, commands for waking a processor from a sleep state and for accessing the specified resource; and
responsive to a decision to transmit the commands, transmit the commands via the network interface, wherein the specified resource comprises an application and wherein the commands comprise a command for launching an instance of the application within an operating system environment established at least in part by the processor woken from the sleep state.

16. The system of claim 15 comprising instructions to render a graphical user interface in response to receipt of a request to access the user account.

17. The system of claim 16 wherein the graphical user interface comprises one or more control graphics for generating a certificate that comprises one or more restrictions that restrict access to the specified resource.

18. The system of claim 15 wherein the certificate comprises one or more restrictions.

19. The system of claim 18 wherein the one or more restrictions comprise a time restriction.

* * * * *